United States Patent [19]

Lee

[11] Patent Number: 5,541,798
[45] Date of Patent: Jul. 30, 1996

[54] MODE DETECTING APPARATUS FOR A VIDEO CASSETTE RECORDER

[75] Inventor: Hyun M. Lee, Seoul, Rep. of Korea

[73] Assignee: Daewoo Electronics Co., Ltd., Seoul, Rep. of Korea

[21] Appl. No.: 338,861

[22] Filed: Nov. 14, 1994

[30] Foreign Application Priority Data

Dec. 15, 1993 [KR] Rep. of Korea ............... 93-27802

[51] Int. Cl.⁶ .................................. G11B 15/08
[52] U.S. Cl. ................................... 360/137
[58] Field of Search ........................ 360/137

[56] References Cited

U.S. PATENT DOCUMENTS 5,079,665 1/1992 Yang ............................ 360/137
5,293,249 3/1994 Hoong ......................... 360/79 X Primary Examiner—John Wolff
Attorney, Agent, or Firm—Oliff & Berridge

[57] ABSTRACT

A new mode detecting apparatus for video cassette recorder which is capable of linearly directly controlling the mode position is disclosed. A light emitting diode is installed under a main deck. A mode driving plate is provided with a plurality of holes for selectively passing the light from the light emitting diode. The light which have passed through the holes of the mode driving plate are sensed by photo transistors which then generates electrical signals. The signals are sent to a microcomputer which then detects the mode of the deck. The constitution of the gears is simplified, and the mode can be recognized and controlled by the mode driving plate directly and linearly.

6 Claims, 5 Drawing Sheets

5,541,798

MODE DETECTING APPARATUS FOR A VIDEO CASSETTE RECORDER

BACKGROUND OF THE INVENTION

1. Field of the Invention

The present invention relates to a mode detecting apparatus for a video cassette recorder. More particularly, the present invention relates to a mode detecting apparatus in which the mode can be linearly accurately detected for controlling the operating mode of deck of the video cassette recorder.

2. Description of the Prior Art

In a video cassette recorder, the mode represents the operating state between the circuits and the mechanism, and the mode is classified generally into a play mode, a still mode, a recording mode, a fast forward winding mode, a rewinding mode, etc. According to the kind of modes, the respective components of the circuits and the mechanisms have to be positioned at the predetermined positions, and therefore, the detecting and controlling of the mode are known to be important matters.

FIG. 1 is a schematic view showing a constitution of a conventional deck mechanism. Referring to FIG. 1, when a loading motor 1 is driven, the driving force of loading motor 1 is transmitted through a worm gear 3 to a cam gear 5 to rotate cam gear 5. The rotation force of cam gear 5 is transmitted through a relay plate 11 (having a rack portion 11a on a side surface thereof) and a relay gear 13 (meshed with rack portion 11a of relay plate 11) to a mode driving plate 15. Mode driving plate 15 operates the drive-related components of the video cassette recorder in such a manner that the are operated at the predetermined positions.

FIG. 2 is a schematic view for showing the constitution of the mode driving section for illustrating in more detail the operation of mode driving plate 15. A mode driving plate 15A is a detailed illustration of mode driving plate 15 of FIG. 1. Mode driving plate 15A is provided with a rack portion 15B on an outer peripheral portion thereof, and rack portion 15B is meshed with relay gear 13. Mode driving plate 15A has an elongate form extending across the deck, and various cam portions are disposed on mode driving plate 15A for controlling various components connected to mode driving plate 15A. The reason why mode driving plate 15A has an elongate form is that mode driving plate 15A receives the driving force from loading motor 1 through cam gear 5, relay plate 11 and the relay gear 13 of FIG. 1, thereby controlling various driving components for driving a tape such as a brake opening and closing device, a tension lever, and a review lever.

FIG. 3 is a schematic view for illustrating the position of mode driving plate 15A within the video cassette recorder. As shown in FIG. 3, mode driving plate 15A is generally provided between a main deck 17 and a main circuit board 19.

When the deck part of a video cassette recorder is driven through mode driving plate 15A, the various mode positions can be detected by a mode switch 7 which is connected to cam gear 5. The detected signals are inputted into a microcomputer (hereinafter, referred to as "micom") 9, and then, the signals are fed back to loading motor 1.

FIG. 4A is a schematic view for illustrating the mode detecting principle in mode switch 7. As illustrated in the drawing, mode switch 7 includes a switching disc 7A and a brush supporting member 7B. Switching disc 7A is provided with a plurality of tracks which are divided into the conductive portions and non-conductive portions, while the brush supporting member 7B supports a plurality of brushes 9a, 9b, 9c and 9d which contact with the tracks of switching disc 7A. The number of tracks and the brushes is generally 3 to 5.

FIG. 4B is a plan view of switching disc 7A. Referring to FIG. 4B, a hatched portion 8a is a conductive portion, while a non-hatched portion 8b is a non-conductive portion. On the switching disc 7A shown in the drawing, there are four tracks T1, T2, T3 and T4 which have conductive portions 8a and non-conductive portions 8b. Correspondingly to four tracks T1, T2, T3 and T4, there are provided first, second, third and fourth brushes 9a, 9b, 9c and 9d on the bottom of brush supporting member 7B. These brushes 9a, 9b, 9c and 9d contact with the tracks T1, T2, T3 and T4 at predetermined positions, thereby producing the on and off signals in each of the brushes. The produced signals are sent to the micom (9 of FIG. 1) so as to detect the mode of the video cassette recorder.

In the case where there are four brushes, the four brushes 9a, 9b, 9c and 9d are capable of detecting $2^4-1=15$ modes excluding the off state of all four brushes 9a, 9b, 9c and 9d. For example, when the brushes 9a, 9b, 9c and 9d are contacted with the line A—A of FIG. 4B, the first, third and fourth brushes 9a, 9c and 9d generate "0" signals which are off signals. The second brush 9b generates an "1" signal which is an on signal, and thus, the combined signals "0100" are transmitted to micom 9. Micom 9 compares the received signals with reference signals, thereby discriminating the current deck mode.

In the conventional mode detecting apparatus described above, a rotary type is adopted using various components such as loading motor 1, cam gear 5, switching disc 7A, and a plurality of brushes. Therefore, not only the mechanism is complicated, but also various indirect components such as the switching disc and the brushes are used, with the result that the manufacturing cost is increased. Further, the mode switch is disposed on the cam gear, and therefore, the bulk of the cam gear is increased, and the shape of the cam becomes complicated.

Further, the areas of the conductive portion is different from the peripheral portion to the central portion, and therefore, the conductive contacting areas of the brushes become different, with the result that it becomes difficult to obtain a combined mode signal at the accurate position. Therefore, it may be difficult to detect and to control the deck mode of the video cassette recorder.

SUMMARY OF THE INVENTION

The present invention is intended to overcome the above described disadvantages of the conventional techniques.

Therefore, it is an object of the present invention to provide a mode detecting apparatus for a video cassette recorder, in which a linearly and directly positional control can be carried out.

For achieving the above object, the mode detecting apparatus of a video cassette recorder according to the present invention includes:

a means for generating a light installed under a main deck;

a mode driving plate provided with a plurality of holes for selectively passing the light from the light generating means in accordance with a deck mode, and for transmitting a driving power of a loading motor to components of the main deck to drive them;

a means for sensing the light passed through said holes of the mode driving plate to generate a signal; and a means for detecting the signal of the light sensing means, and for comparing the signal with a reference signal to thereby recognize a mode of the video cassette recorder.

According to one embodiment of the present invention, the mode detecting apparatus includes a light dispersing means for dispersing the light of the light emitting means into a plurality of rays (or beams) to be irradiated onto the mode driving plate. As the light dispersing means, for example a prism may be mentioned.

As the light generating means, for example, a light emitting diode may be mentioned, and as the light sensing means a photo transistor or a photo diode may be mentioned.

The light which is generated by the light generating means are irradiated onto the mode driving plate, and the light selectively passes through the holes of the mode driving plate and is irradiated into the plurality of the light sensing means, thereby generating electrical signals. The electrical signals are added together to form combined signals. The combined signals are inputted into the mode detecting means, so that the mode of the deck of the video cassette recorder can be discriminated, and that the mode of the deck may be converted, when necessary.

According to the present invention, the conventional mode detecting device which includes a switching disc and brushes is not required, and therefore, the constitution of the cam gear is simplified so as to save the manufacturing cost. Further, as the mode detecting device is installed on the mode driving plate, the mode on the mode driving plate can be directly and linearly recognized, with the result that the mode can be recognized accurately without any error.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Hereinafter, the present invention will be explained with reference to the accompanying drawings.

Figure 1:
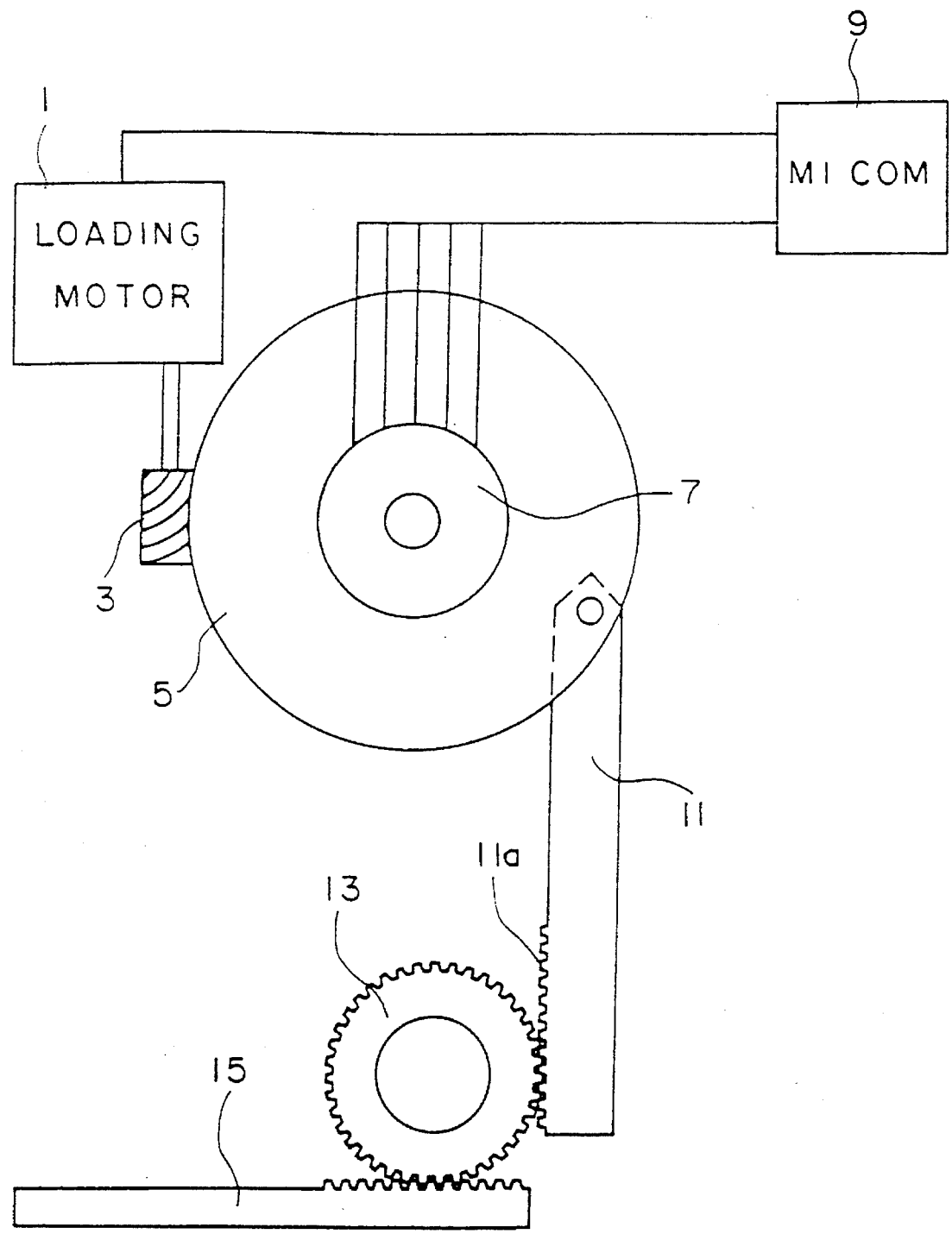
FIG. 1 is a schematic view for showing the constitution of the conventional deck mechanism.
Figure 2:
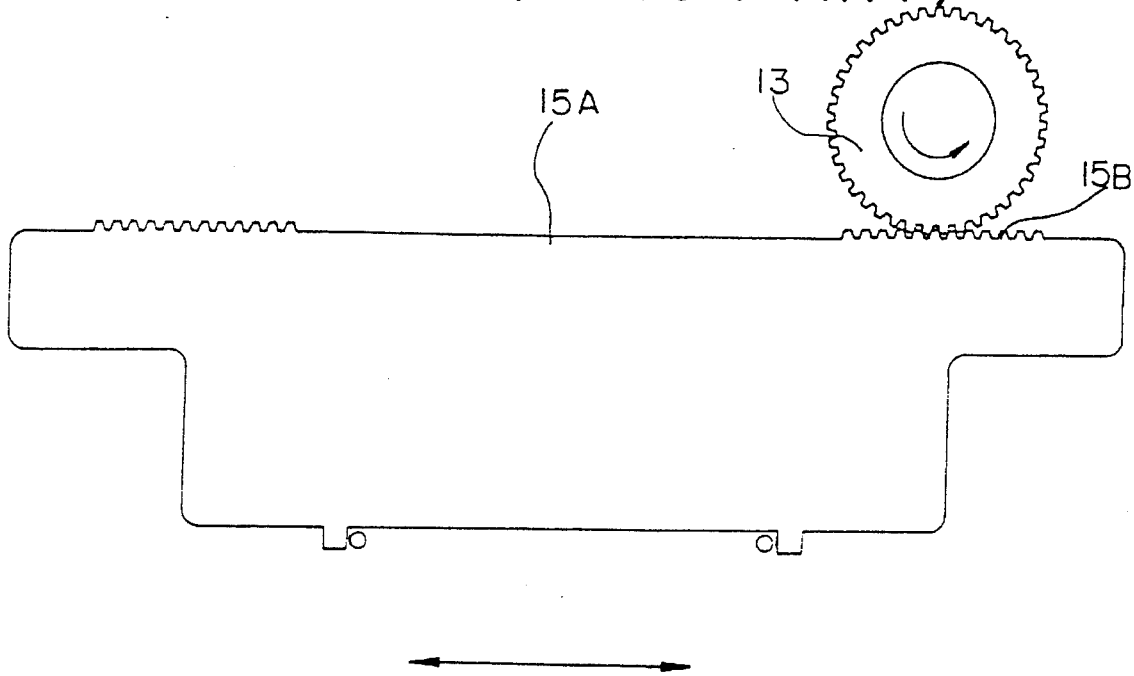
FIG. 2 is a schematic view of the mode driving section for showing in more detail the operation of the conventional mode driving plate.
Figure 5:
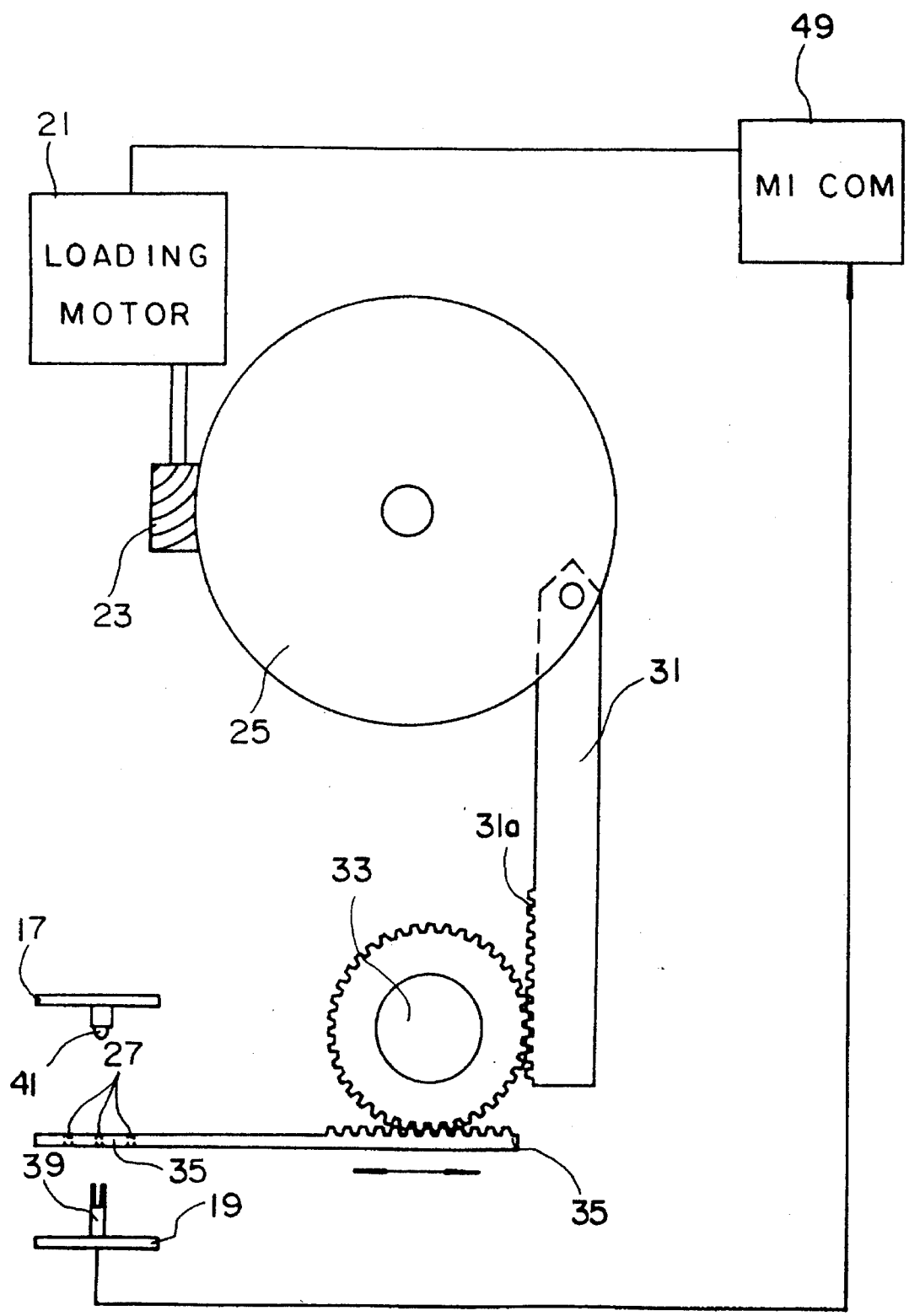
FIG. 5 is a schematic view showing the constitution of the deck mechanism of the video cassette recorder according to one embodiment of the present invention.

FIG. 5 is a schematic view showing the constitution of the deck mechanism of a video cassette recorder according to one embodiment of the present invention. In the video cassette recorder according to the present invention, similarly to the conventional video cassette recorder as shown in FIG. 1, when a loading motor 21 is driven, the driving force of loading motor 1 is transmitted through a worm gear 23 to a cam gear 25, with the result that cam gear 25 is rotated. The driving force of cam gear 25 is transmitted through a relay plate 31 and a relay gear 33 to a mode driving plate 35, and relay plate 31 is provided with a rack portion 31a on a side thereof, while relay gear 33 is meshed with rack portion 31a of relay plate 31. Mode driving plate 35 operates various drive-related components of the video cassette recorder, which are connected to mode driving plate 35, so that they may be operated at the predetermined positions under the respective mode state.

Figure 3:
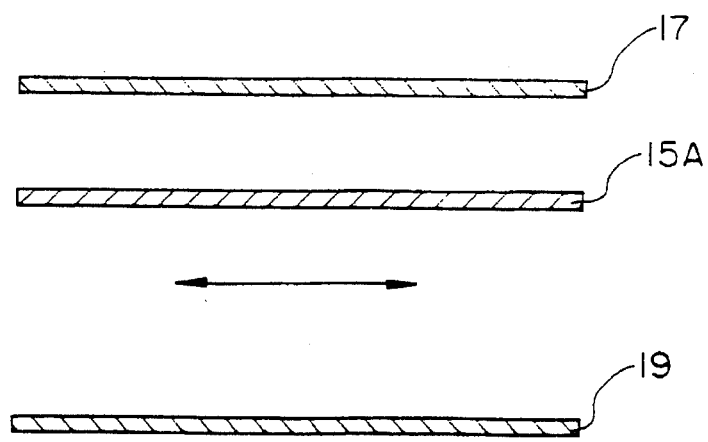
FIG. 3 is a schematic view for illustrating the position of the mode driving plate within the video cassette recorder.
Figure 4A:
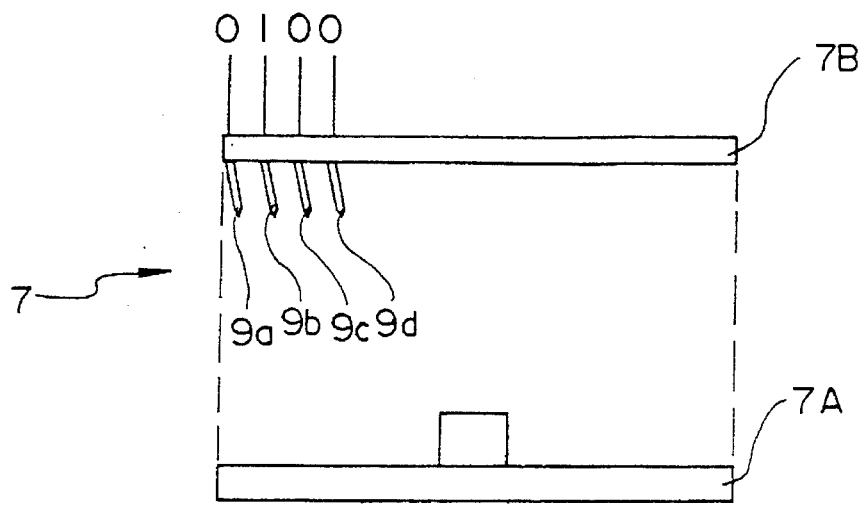
FIG. 4A is a schematic view for illustrating the mode detecting principle in a mode switch.
Figure 4B:
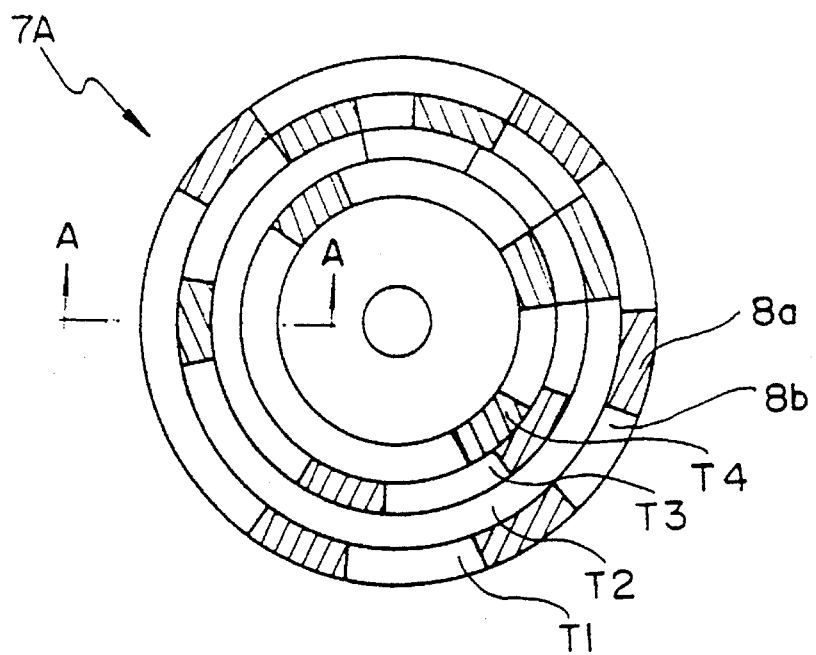
FIG. 4B is a plan view of the switching disc 7A of FIG. 4A.

At a portion of mode driving plate 35, there are formed a plurality of holes 27 through which light rays pass in a selective manner in accordance with the mode of the video cassette recorder. As in mode driving plate 15A of FIG. 3, mode driving plate 35 has an elongate form extending across main deck 17 and is provided with various cams for driving various components which are installed on a main deck 17. In the same manner as in FIG. 3, mode driving plate 35 is disposed between main deck 17 and a main circuit board 19. Mode driving plate 35 receives the driving force from driving motor 21 through relay gear 33 so as to move left and right.

A light emitting diode 41 as a light generating device is installed under main deck 17 and above the portion where holes 27 of mode driving plate 36 are formed. In the present embodiment of the present invention, the light emitting diode 41 is used as the light generating device, but any device which can emit light rays to be converted to electrical signals may be acceptable without any limitation. Between light emitting diode 41 and mode driving plate 35, there is installed a prism 43 as a light dispersing device for dispersing the light from light emitting diode into a plurality of light rays.

On main circuit board 19, there are disposed a photo transistors 39 as a light sensing device for sensing the light rays passing through holes 27 of mode driving plate 35. When the light rays which are generated by light emitting diode 27 are irradiated onto photo transistor 39 after passing through prism 43 and holes 27, photo transistor 39 is turned on. On the other hand, when the light rays do not pass through holes 27 and therefore shielded by mode driving plate 35, the photo transistor 39 is in the off state. Photo transistors 39 are provided in a proper number on main circuit board 19 in accordance with the arrangement of holes 27. For example, when the number of the mode in the video cassette recorder is less than 7, holes 27 are arranged in a 3-column and 7-row matrix form based on the moving direction of mode driving plate 35, so that 7 different combined signals may be formed.

When the deck part of the video cassette recorder is driven through mode driving plate 35, the light which is generated from light emitting diode 41 are irradiated onto mode driving plate 35 after passing through the prism 43. The light pass through holes 27 of mode driving plate 35 in a selective manner to be inputted into photo transistors 39 which then generate electrical signals. Photo transistors 39 are provided in a proper number by taking into account the arrangement of holes 27. In the case where a 3-column and 7-row matrix is formed as mentioned above, three photo transistors 39 are provided.

When the light rays which have passed through prism 43 are irradiated onto mode driving plate 35, and when the light rays which have passed through the holes 27 are irradiated onto photo transistors 39 to turn on them, with the result that an electrical signal "1" is generated. On the other hand, when the light rays are shielded by mode driving plate 35, then photo transistors are turned off, with the result that an electrical signal "0" is generated.

The above described electrical signals are summed together to form a combined signal. The combined signals are inputted into a micom 49 as a means for detecting the mode which have stored certain reference signals in accordance with the deck modes respectively. Micom 49 compares the received combined signals with the reference signals, thereby judging the current mode of the deck of the video cassette recorder. Further, based on the command of the user, driving signals are fed back into driving motor 21, so that the mode of the deck of the video cassette recorder can be converted depending on the need.

Figure 6:
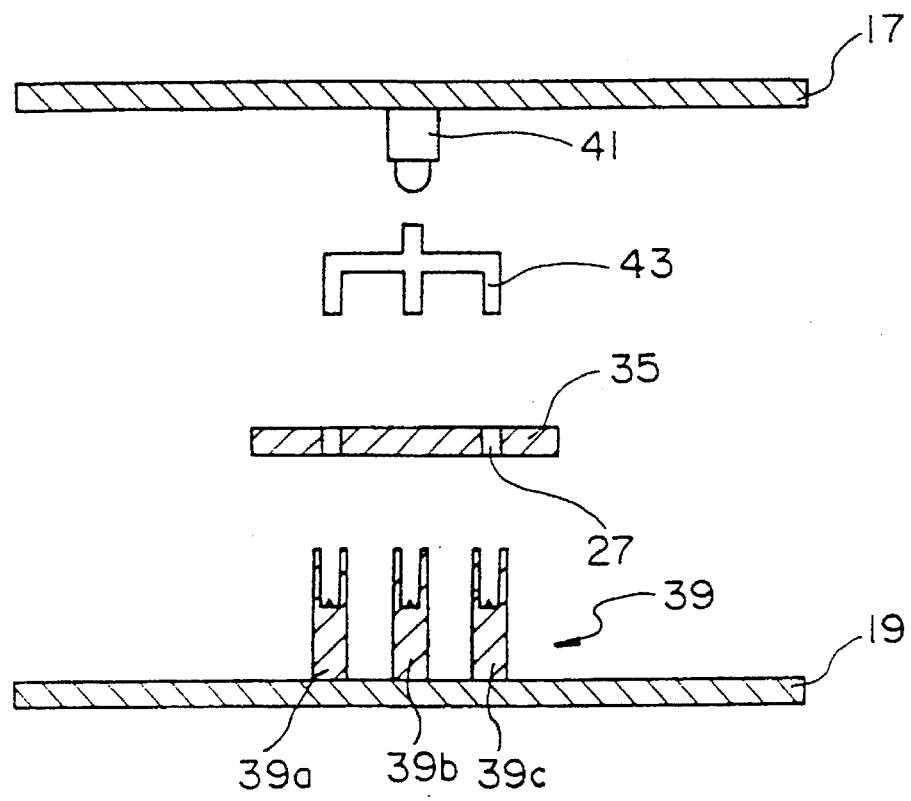
FIG. 6 is a schematic sectional view showing in more detail the constitution of the mode detecting device according to one embodiment of the present invention.
Figure 7:
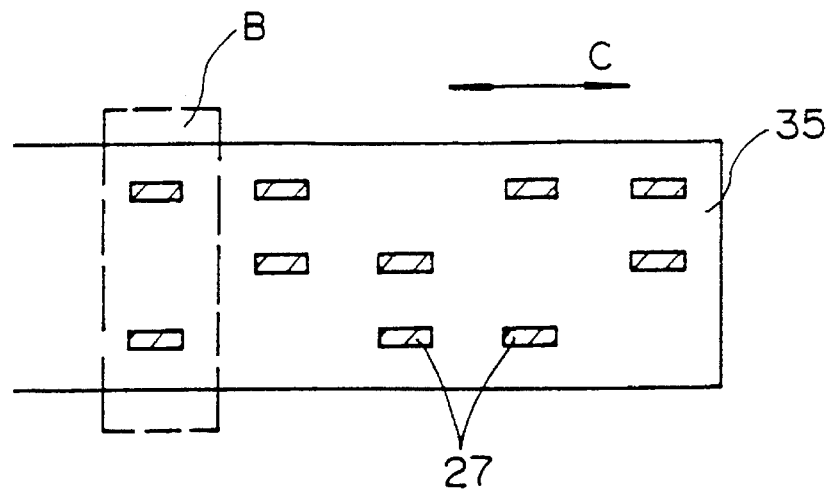
FIG. 7 is a partial plan view showing the hole formation portion of the mode driving plate of FIG. 6.

FIG. 6 is a schematic sectional view for illustrating in more detail the mode detecting apparatus according to the present invention and FIG. 7 is a partial plan view showing the portion of mode driving plate 35 of FIG. 6 where holes 27 are formed.

As shown in FIG. 7, at the portion of mode driving plate 35 where holes 27 are formed, a plurality of holes 27 are arranged in 3-columns in parallel with the movement of mode driving plate 35, in such a manner that 3-column on/off combined signals should be generated. Excluding the case where all the three columns generate off-signals, $2^3-1=7$ kinds of combined signals can be generated, and therefore, 7 kinds of modes can be detected in a video cassette recorder. Mode driving plate 35 can move to left and right (in the direction of an arrow mark C) so as to drive various components on the main deck 17, and so as to enable the light generated from light emitting diode 41 to selectively pass through holes 27.

As shown in FIG. 6, in accordance with the arrangement of holes 27, three photo transistors, i.e., a first, a second and a third photo transistors 39a, 39b and 39c are provided on main circuit board 19. On a corresponding portion under main deck 17 to photo transistors 39a, 39b and 39c, a light emitting diode 41 is installed. Between light emitting diode 41 and mode driving plate 35, there is provided a prism 43 which disperses the light generated from light emitting diode 41 into three separate light rays corresponding to three columns of holes 27 of mode driving plate 35. In the preferred embodiment of the present invention, one light emitting diode 41 and one prism 43 is used for dividing the light generated therefrom into three light rays are used, but in replacement of these three light emitting diodes 41 can be used to irradiate the light rays directly onto mode driving plate 35.

In the video cassette using the mode detecting device, in accordance with the commands of the user, when loading motor 21 is driven by receiving a command from micom 49, the driving force of loading motor 21 is transmitted through worm gear 23 to cam gear 25 to rotate cam gear 25. The driving force of cam gear 25 is transmitted through relay plate 31 and relay gear 33 to mode driving plate 35, so that mode driving plate 35 would perform reciprocating movements over a certain distance. Mode driving plate 35 drives various mode-driving related components connected therewith of the video cassette recorder so that they are driven in each mode states at predetermined positions.

At this time, light emitting diode 41 generates a light, and this light passes through prism 43 where it is dispersed into three light rays which are to be irradiated onto mode driving plate 35. The irradiated light rays pass through holes 27 of mode driving plate 35 in a selective manner. The light rays which have passed through holes 27 are irradiated onto first, second and third photo transistors 39a, 39b and 39c, formed on main circuit board 19 to thereby generate electrical signals. For example, as shown in FIG. 7, when the portion B of mode driving plate 35 having holes 27 comes to be positioned below prism 43, the outer two rays among the three rays pass through the holes 27, so that first and third photo transistors 39a and 39c would be turned on by receiving the light rays, and that electrical signals "1" would be generated. On the other hand, the central ray is shielded by mode driving plate 35, with the result that second photo transistor 39b is turned off, and that an electrical signal "0" is generated. The electrical signals generated from first, second and third photo transistors 39a, 39b and 39c are combined together to form a combined signal "101". The combined signal is transmitted to micom 49, which compares the combined signal with a reference signal to make a judgment on the mode of the deck of the video cassette recorder. When the mode of the deck does not correspond with the selection of the user, the mode of the deck is converted by driving the loading motor. This operation is repeated, thereby accurately detecting and controlling the mode of the deck.

When the mode detecting apparatus according to the present invention is used, the conventional mode detecting device which includes a switching disc and brushes is not required, and therefore, the constitution of the cam gear is simplified, with the result that the manufacturing cost is saved.

Further, the mode detecting devices is installed on the mode driving plate, and therefore the mode can be directly and linearly detected and controlled, so that the mode can be accurately detected and controlled without error.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A mode detecting apparatus in a video cassette recorder comprising:

a means installed under a main deck for generating a light;

a mode driving plate provided with a plurality of holds for selectively passing the light from the light generating means in accordance with an operating mode of deck, and for transmitting a driving power of a loading motor to components of the main deck to drive them, said mode driving plate being moved left and right by the driving power, the plurality of holes being arranged in parallel with the movement of said mode driving plate, and the operating modes being recognized as the combination of positions which the holes are formed;

a means for sensing the light that has passed through said holes of the mode driving plate to generate a signal; and a means for detecting the signal of the light sensing means, and for comparing the signal with a reference signal to thereby recognize the operating mode of deck.

2. The mode detecting apparatus in a video cassette recorder as claimed in claim 1, said mode detecting apparatus further comprising a light dispersing means for dispersing the light of the light generating means into a plurality of rays to be irradiated onto said mode driving plate.

3. The mode detecting apparatus in a video cassette recorder as claimed in claim 2, wherein said dispersing means is a prism.

4. The mode detecting apparatus in a video cassette recorder as claimed in claim 1, wherein said light generating means is a light emitting diode.

5. The mode detecting apparatus in a video cassette recorder as claimed in claim 1, wherein said light sensing means is a photo transistor.

6. A mode detecting apparatus in a video cassette recorder comprising:

a light emitting diode installed under a main deck for generating a light;

a prism for dispersing the light of said light emitting diode into a plurality of rays to be irradiated onto the main deck;

a mode driving plate provided with a plurality of holes for selectively passing said plurality of rays dispersed from the light by said prism in accordance with an operating mode of deck, and for transmitting a driving power of a loading motor to components of the main deck to drive them, said mode driving plate being moved left and right by the driving power, the plurality of holes being arranged in parallel with the movement of said mode driving plate, and the operating modes being recognized as the combination of positions which the holes are formed;

a photo transistor for sensing the plurality of rays that have passed through said holes of said mode driving plate to generate a signal; and a mode detecting means for recognizing the mode of the video cassette recorder by detecting the signal of said photo transistor and comparing the signal with a reference signal.

* * * * *